United States Patent
Hebbar et al.

(10) Patent No.: US 8,922,921 B1
(45) Date of Patent: Dec. 30, 2014

(54) MAGNETIC DISK SERVO WEDGES WITH PARTIAL TRACK IDENTIFIERS

(71) Applicant: Seagate Technology LLC, Cupertino, CA (US)

(72) Inventors: Ravi Hebbar, Longmont, CO (US); Russel Clemmons, Longmont, CO (US); Bruce D. Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/071,912

(22) Filed: Nov. 5, 2013

(51) Int. Cl.
*G11B 5/86* (2006.01)

(52) U.S. Cl.
USPC ..... 360/17; 360/77.05; 360/77.08; 360/78.14

(58) Field of Classification Search
None
See application file for complete search history.

(56) References Cited

U.S. PATENT DOCUMENTS

| | | | |
|---|---|---|---|
| 6,118,603 A | 9/2000 | Wilson et al. | |
| 6,952,320 B1 | 10/2005 | Pollock et al. | |
| 7,116,505 B1* | 10/2006 | Kupferman | 360/48 |
| 7,800,853 B1 | 9/2010 | Guo et al. | |

* cited by examiner

*Primary Examiner* — Muhammad N Edun
(74) *Attorney, Agent, or Firm* — Hollingsworth Davis, LLC (57) ABSTRACT

A first portion of a track identifier is read from a first servo wedge of a track of a magnetic disk. A second portion of the track identifier is read from a second servo wedge of the track. The second portion includes least-significant bits of the track identifier that are also stored in the first portion. The first and second portions are combined to determine the track identifier for the first and second servo wedges, and the track is identified using the track identifier.

18 Claims, 9 Drawing Sheets

MAGNETIC DISK SERVO WEDGES WITH PARTIAL TRACK IDENTIFIERS

SUMMARY

The present disclosure is related to magnetic disk servo wedges with partial track identifiers. In one embodiment, methods and apparatuses facilitate reading a first portion of a track identifier from a first servo wedge of a track of a magnetic disk. A second portion of the track identifier is read from a second servo wedge of the track. The second portion includes least-significant bits of the track identifier that are also stored in the first portion. The first and second portions are combined to determine the track identifier for the first and second servo wedges, and the track is identified using the track identifier.

In another embodiment, a method involves writing M1 bits of a first portion of an M-bit track identifier to a first servo wedge of a track of a magnetic disk. The magnetic disk has T tracks such that $2^M \geq T$ and $2^{M-1} < T$. The method further involves writing M2 bits of a second portion of the track identifier to a second servo wedge of the track. The first portion and the second portion satisfy a relationship M1+M2>M, wherein the first and second portions are combined to identify the track via the track identifier.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures.

DETAILED DESCRIPTION

The present disclosure is generally related to arrangement of servo wedges (also referred to as servo sectors or servo patterns) on a recordable medium (e.g., magnetic disk) of a data storage system. The servo wedges enable a servo control system to determine precisely where on the recordable medium a read/write head is located. The servo sectors may be pre-formatted on the recordable medium during manufacturing. The servo wedges are generally interspersed on the recording medium between data sectors, which are regions within a track used to store user data on the recording medium.

In various embodiments described herein, data is arranged in the servo wedge in such a way that the amount of data used by the servo wedges is reduced. Generally, the servo wedges use a reduced amount of space for storing track identifiers. This can free up data storage space for other purposes, such as increasing available user data or increasing the amount of overhead data that can be used to compensate for data storage regions that have failed or become unreliable. A device with these reduced-size servo wedges can still provide equivalent performance (e.g., number of seek/tracking errors, seek time) as devices that use full track identifiers in the servo wedges.

Figure 1:
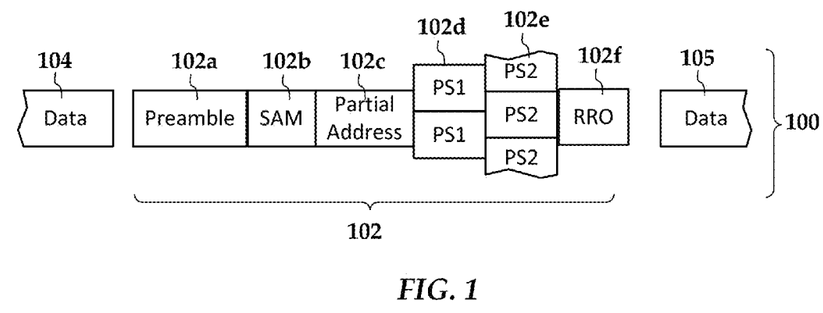
FIG. 1 is a block diagram of a servo wedge according to an example embodiment.

In FIG. 1, a block diagram illustrates an arrangement of data within a servo wedge 102 according to an example embodiment. The servo wedge 102 is located on a track 100 between a preceding data sector 104 and a following data sector 105. The data sectors 104, 105 store user data, and embodiments described herein may be used with any type and arrangement of data sectors. Generally, servo wedges will be located along a track, separated from each other by data sectors. For purposes of this discussion, two servo wedges on the same track that are not separated by another servo wedge will be referred to as "downtrack adjacent." Downtrack adjacent servo wedges may be distinguished from one another by identifying them as "even" and "odd," although this does not require that identifiers of the wedges be even or odd numbers.

The servo wedge 102 includes a preamble 102a, servo address mark (SAM) 102b, servo address 102c (also referred to as track ID), position burst (PS) fields 102d, 102e, and one or more repeatable runout (RRO) fields 102f. The preamble 102a is a known magnetic pattern that is read back as a signal. The SAM 102b also includes a known pattern of bits that are read following the preamble 102a. Together, the preamble 102a and SAM 102b allow a read/write channel to positively determine that the beginning of the servo wedge 102 has been detected, and facilitates synchronizing the servo signal to read the subsequent data stored in the servo wedge 102.

In conventional servo wedge arrangements, the address field 102c includes a pattern (e.g., Gray code) that identifies the track in which the servo wedge 102 is located. As will be discussed in greater detail below, the illustrated address field 102c contains a partial address, which facilitates reducing an amount of storage space consumed by the servo wedges. The position fields 102d, 102e are burst fields that are used to determine a fractional position. For example, the position burst fields 102d, 102e facilitate fine alignment of the read/write head on the track. The RRO fields 102f also facilitate proper alignment of the read/write heads on a track by correcting for known runout errors.

In the arrangement shown in FIG. 1, there is no explicit identifier shown for the sector. Generally, each sector will contain an individual identifier (e.g., Gray code) that allows the device to determine the current angular position of the drive. While the servo wedge may contain a separate field (not shown) for sector identifier, in this example the servo identifier is included as part of the track identifier. This may be accomplished, e.g., by appending the servo identifier to the track identifier. If there are between 256 and 511 servo wedges per track, for example, this may be accomplished by appending 9 bits to the track identifier.

In an alternate arrangement, the servo sector identifier can be encoded with the track identifier. This will result in some track identifiers being non-unique. However, the risk of misinterpreting a track identifier can be reduced by choosing an encoding scheme that ensures that some number of least significant bits (e.g., 8-bits) are locally unique between adjacent tracks. In such a case, so long as a track prediction algorithm can reliably place the read-write head within $+/-2^{L/2}$ tracks, the read/write head can find the desired track from the lower bits, as well as verify the full track identifier and decode sector identifier by performing the inverse operation of the encoding scheme on the upper bits.

While each servo wedge 102 is relatively small, there are large numbers of them (e.g., on the order of one to ten million). The area used to store the servo wedges on a hard disk reduces area available to store user data. As such, reducing the size of the servo wedge enables higher drive capacity and/or more margin for a given capacity. As shown in FIG. 1, one way to reduce the servo wedge size is by splitting the Gray code track information in partial address field 102c between pairs of servo wedges. Storage device firmware uses an algorithm to combine multiple partial address fields 102c when accessing tracks. This firmware may take into account that the servo tracks may be virtual tracks, as opposed to the actual servo tracks that are written, e.g., via a multi-disk writer during manufacture of the disks, or written in-drive.

Servo wedges may be written onto individual disks using a multi-disk writer during manufacture of a drive. One or more disks are then attached together to a spindle motor that rotates the disk in the storage device. Due to mechanical tolerances inherent in mass production, it may be infeasible to perfectly align the rotation center of the disk on the multi-disk writer with the rotation center of the disk in the drive. Therefore the servo tracks of the attached disks may be eccentric with the drive spindle center and create a significant once around runout. Also, the disks may distort while being clamped to the spindle using disk clamps. This distortion may lead to higher order runout.

One way to deal with the runout is to follow the physical servo tracks written by the multi-disk writer. In this case the arm actuator that controls the read/write head will have to move continuously (e.g., oscillate in a cross track direction) to stay on a physical servo track as the disk revolves. This continuous compensation of the actuator arm position-causes performance degradation during seeks and increases settling times.

Another way is to deal with runout is to virtualize the servo tracks. The virtual servo tracks can be constructed using the physically written tracks as a reference so that the actuator does not have to move significantly in order to stay on a virtual track. Servo track virtualization can be accomplished by changing the reference for every servo wedge of the virtual track. The amount of change in the reference for each servo wedge of every virtual track is determined during drive calibration process and is fixed for the life of the drive.

Whether or not the drive uses virtual tracks or as-written tracks, the drive will have a mechanism for finding a particular track, e.g., in response to a seek request. As noted above, the servo wedges include an address field (or track ID field) that has a Gray coded identifier that is uniquely identified with a particular servo track. The minimum number of bits (M) required to uniquely represent each servo track (T) is given by the equation $2^M \geq T_{max}$ where $0 \leq T \leq T_{max}$. This may also be expressed as $2^M \geq T$ and $2^{M-1} < T$. So for one million tracks, M=20 ($2^{20}$=1,0485,576≥1,000,000 and $2^{19}$=524,288<1,000,000).

In a scheme that uses the partial address fields 102c shown in FIG. 1, M1 bits are written on a partial address portion 102c of a first servo wedge and M2 bits are written on a partial address portion 102c of a second servo wedge. Generally, these first and second servo wedges may be downtrack adjacent, e.g., even and odd servo wedges. The M1 and M2 bits are partial addresses that can be combined to determine a track identifier for the track in which the first and second servo wedges reside.

The servo controller uses a track prediction algorithm that combines the bits read from the partial address field 102c of two adjacent sectors to refine the prediction. The scheme can be designed to use a minimal amount of bits, such that M1+M2=M. The scheme may also add additional bits to the partial addresses, such that M1+M2>M to provide for more margin in the presence of vibration and during seeks. It is possible to make M1≠M2, including the limiting case where M1≥M and M2=0, or vice versa. Such a configuration is flexible, but introduces complications in both servo firmware and controller firmware because of the uneven servo gate sizes on the odd and even servo wedges.

In the present disclosure, an example scheme will be described for a disc surface with about one million unique tracks, such that M=20. This value is provided for purpose of illustration, and the concepts described below can be extended to other values of M. In this example scheme, the partial address field 102c will be the same on both first and second servo wedges, e.g., M1=M2 (which also means that M will be an even number). This reduces complexity for both servo and controller firmware. It will be understood, however, that the concepts may be adaptable to schemes where M1≠M2, including where M is an odd number.

For two cases of this M1=M2 example, M1+M2 may be equal to M or greater than M. In the first case M1+M2=M, and M1+M2=M/2. Assuming M=20, the partial addresses are selected such that the track ID is split into two 10 bit partial addresses. The partial addresses are written on downtrack adjacent servo wedges via a multi-disc writer. The partial addresses can be arranged such that the lower 10 bits of the track identifier are on one set of servo wedges (e.g., even servo wedges) and the upper 10 bits of the track identifier on the other set of servo wedges (e.g., odd servo wedges). Other arrangements may be used, e.g., middle 10 bits on one servo wedge, and beginning B bits and ending E bits on the other wedges, where B+E=10.

With the M/2-size partial address scheme, one of the first or second servo wedges of a pair will not have the lower, least-significant, bits of the track address stored in the partial address field. As such, the servo controller may have to rely on a prediction algorithm and the +/−1 track information obtained from the position bursts to positively identify the correct track. This is because the upper bits will generally not change between adjacent tracks, and only one wedge of an even/odd pair might have a true Gray code partial address that changes by a single bit between successive track identifiers.

In a second case, M1=M2, M1+M2=M+N (N>0). An example embodiment of this second case where M=20 is shown in the block diagram of FIG. 2. A 20-bit track identifier 202 is divided into first and second portions 204, 206 having 12 bits each, thus M1+M2=24 and N=4. The least significant N=4 bits of the track identifier 202 are stored as least significant bits in both first and second portions 204, 206.

Figure 2:
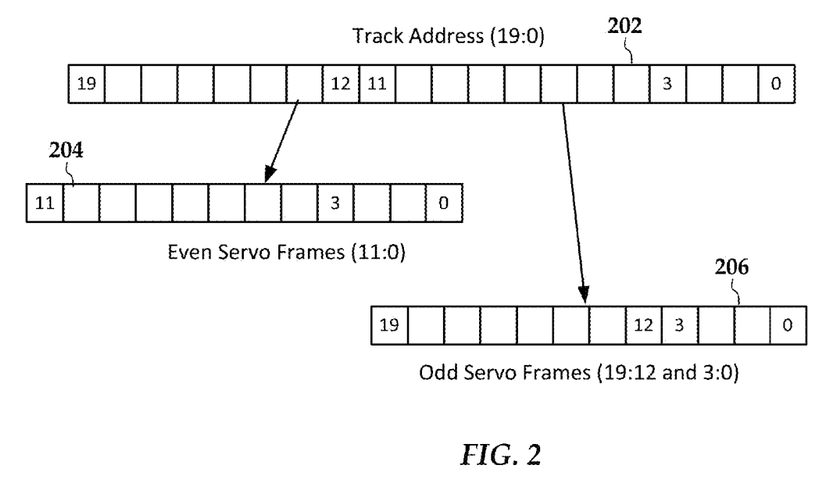
FIG. 2 is a block diagram illustrating partial track identifiers according to an example embodiment.

The first portion 204 includes (M+N)/2 least significant bits of the track identifier. The second portion 206 has (M−N)/2 most significant bits of the track identifier. In this case, M=20 and N=4, so (M+N)/2=12 and (M−N)/2=8. The first portion 204 has the twelve least significant bits of the track identifier and is stored on even servo wedges. The second portion 206 has the eight most significant bits and four least significant bits of the track identifier 202. The second portion 206 is stored on the odd servo wedges. As a result, the lower four bits of the track identifier 202 are stored in both even and odd servo wedges. In this scheme, a ±8 track margin is provided instead of just the ±1 track margin provided by the position bursts.

Where the tracks are virtualized, the controller will use a track prediction algorithm that includes compensation between actual and virtual tracks. Equation [1] below defines the relationship between the physical servo track and the virtual servo track during track following, where $T_V$ is the virtual servo track, $T_P(n)$ is the physical servo track and $V_C(n)$ is the virtualization compensation for servo wedge n.

$$T_P(n)=T_V+V_C(n)T \quad [1]$$

Equation [1] can be extended to predict the track for the next servo wedge during track-follow as given in Equation [2] below. While seeking from one track to another track, the virtual track may change from sample to sample. In such a case, the generalized prediction Equation [3] can be used to predict the physical servo track for both seeking and track-follow cases. Equation [3] indicates that the physical servo track for servo wedge n+1 can be predicted based on the physical servo track for servo wedge n, the desired seek velocity $\delta T_V(n)$ and the change in virtual compensation $\delta V_C(n)$.

$$T_P(n+1)=T_V+V_C(n+1)-V_C(n)=T_P(n)+\delta V_C(n) \quad [2]$$

$$T_P(n+1)=T_V(n+1)+V_C(n+1)=T_V(n)+\delta T_V(n)+V_C(n+1)=T_P(n)+\delta T_V(n)+\delta V_C(n) \quad [3]$$

Where the servos use partial track IDs, the predicted track and a correction mechanism using the track ID data read from the odd and even servo wedges can be employed to obtain the exact track ID. In the following example, for even servo wedges, the upper eight bits from the previous odd servo wedge and the twelve bits from the current servo wedge are combined to construct the 20-bit track ID, $T_C(n)$. The difference between the track ID computed this way and the predicted track ID, $T_P(n)$, is computed, and a difference is used to adjust the predicted track ID. Rollover should be accounted for while doing the subtraction as shown below in Equations [4]-[7] for even servo wedges.

$$\Delta T(n)=T_C(n)-T_P(n) \quad [4]$$

$$\text{if } \Delta T(n)>2048, \text{ then } \Delta T(n)=\Delta T(n)-4096 \quad [5]$$

$$\text{if } \Delta T(n)<-2048, \text{ then } \Delta T(n)=\Delta T(n)+4096 \quad [6]$$

$$T_P(n)=T_P(n)+\Delta T(n) \quad [7]$$

For odd servo wedges, the predicted track is adjusted by the difference between the lower 4 bits read from the track ID field, $B_R(n)$, and the lower four bits of the predicted track, say $B_P(n)$. Both four bit numbers should be considered as positive numbers (since track IDs are typically nonnegative numbers). Rollover should be accounted for while doing the subtraction as follows in Equations [8]-[11].

$$\Delta T(n)=B_R(n)-B_P(n) \quad [8]$$

$$\text{if } \Delta T_P(n)>8, \text{ then } \Delta T(n)=\Delta T(n)-16 \quad [9]$$

$$\text{if } \Delta T_P(n)<-8, \text{ then } \Delta T(n)=\Delta T(n)+16 \quad [10]$$

$$T_P(n)=T_P(n)+\Delta T(n) \quad [11]$$

Generally, a hard disk drive will have multiple read/write heads that track different surfaces of a disk. Even if a single disk is utilized, two heads can be used to track a top and bottom surface of the single disk. Only one head is being read at a time, and so only that head will know exactly where it is tracking. The heads are mounted on arms that track together, and so the other heads will be tracking over generally the same area of the respective disk surfaces. However, the track sizes are significantly smaller than the alignment between heads and tracks, and so when switching to a different heads for reading or writing, the different head will have to determine its current location before it is able to find a desired track.

Head switches from one head to another can be handled by forcing the head switch to happen on an even servo wedge. During drive calibration process the track offset between heads across the stroke is characterized. One uncertainty in such a case is due to the actuator stack tilt due to temperature and/or non-operational shock. By forcing the head switch to happen on an even servo wedge and using the previously characterized track offset data to predict the track identifier, the controller can handle +/−2048 tracks worth of tilt due to temperature and/or shock. This allows for sufficient margin to handle worst case thermal tilt which is less than a couple of hundred tracks and worst case shock which is less than a thousand tracks. The +/−8 track margin on the odd servo wedges also provides sufficient margin to handle sudden mechanical motion due to sudden stress release events (single wedge off track events).

There are other situations where the controller may have to determine its location without any prior knowledge. For example, during drive spin-up, the heads attempt to lock into a servo pattern (sometimes referred to as demod sync). In such a case, the track ID can be constructed using only on the even servo wedge, e.g., by combining the 12 bits of the even servo wedge with the upper 8 bits of the previous odd servo wedge. That combined 20 bit value can be held for the odd servo wedges.

Figure 3:
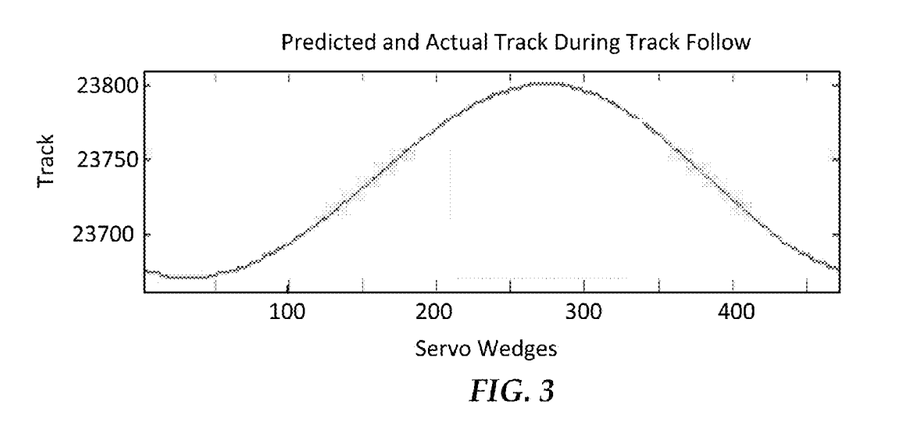
FIGS. 3 and 4 are graphs illustrating track prediction results during track follow for a simulated storage device according to an example embodiment.
Figure 4:
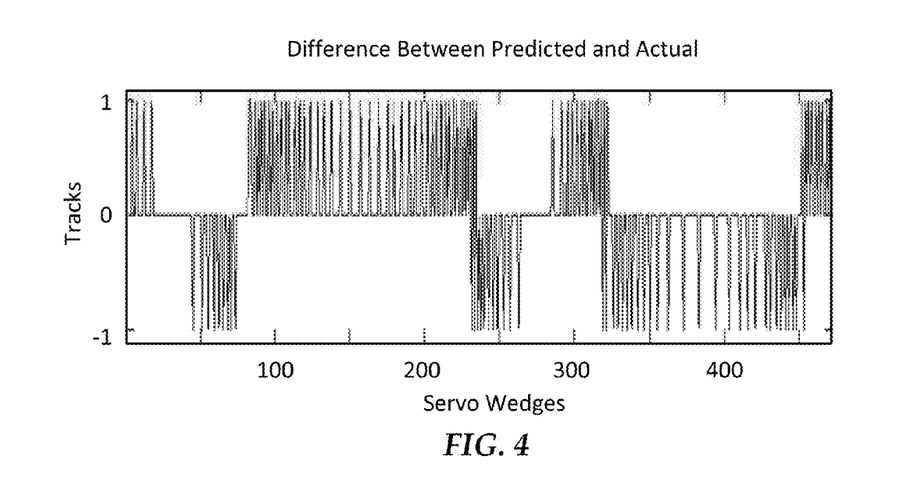

In FIGS. 3-12, graphs illustrate simulated results for a split track identifier arrangement on a drive that has all 20 bits of track ID as shown in FIG. 2. In FIGS. 3 and 4, a graph shows the predicted and actual track identifiers over a virtual track, the vertical scale representing actual track identifiers as written to the disk. As seen in FIG. 3, the eccentricity of the disk spans approximately 200 tracks. As seen in FIG. 4, the maximum prediction error is plus or minus one track. This small of a deviation will not show any difference between the curves of predicted versus actual track identifiers shown in FIG. 3. After correction, there is no deviation between the corrected and actual track values, so no errors during track follow.

Figure 5:
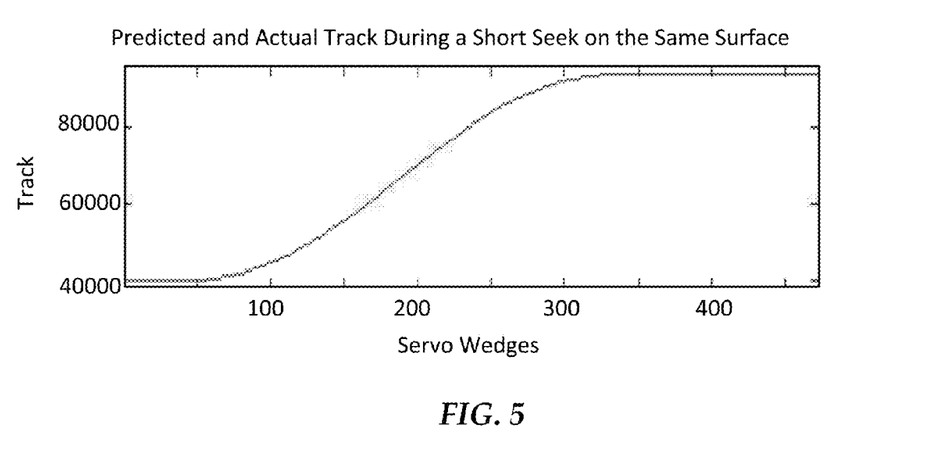
FIGS. 5 and 6 are graphs illustrating track prediction results during short seeks on the same surface for a simulated storage device according to an example embodiment.
Figure 6:
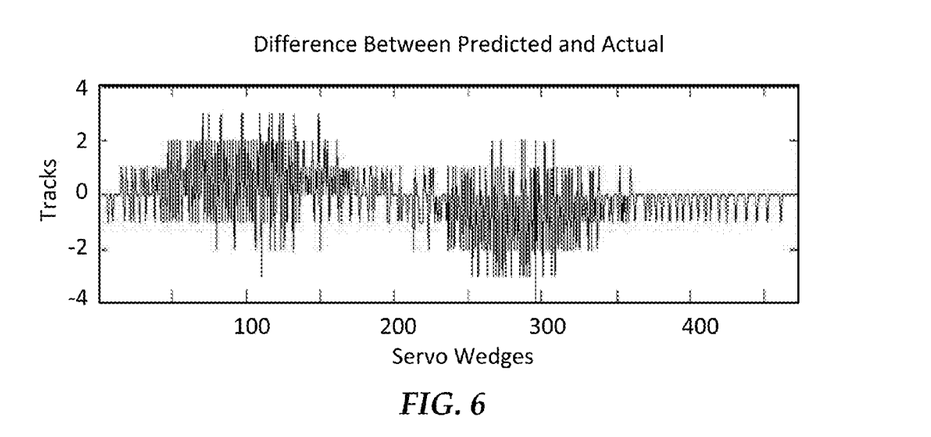
Figure 7:
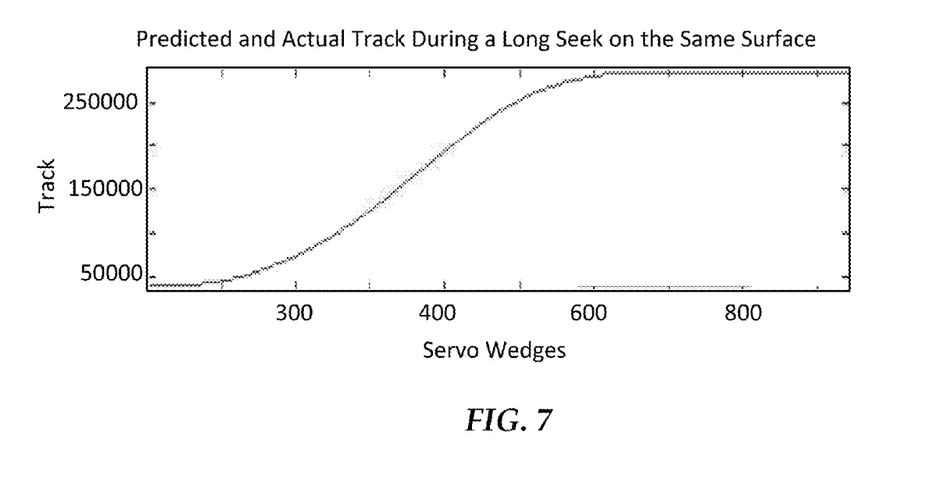
FIGS. 7 and 8 are graphs illustrating track prediction results during long seeks on the same surface for a simulated storage device according to an example embodiment.
Figure 8:
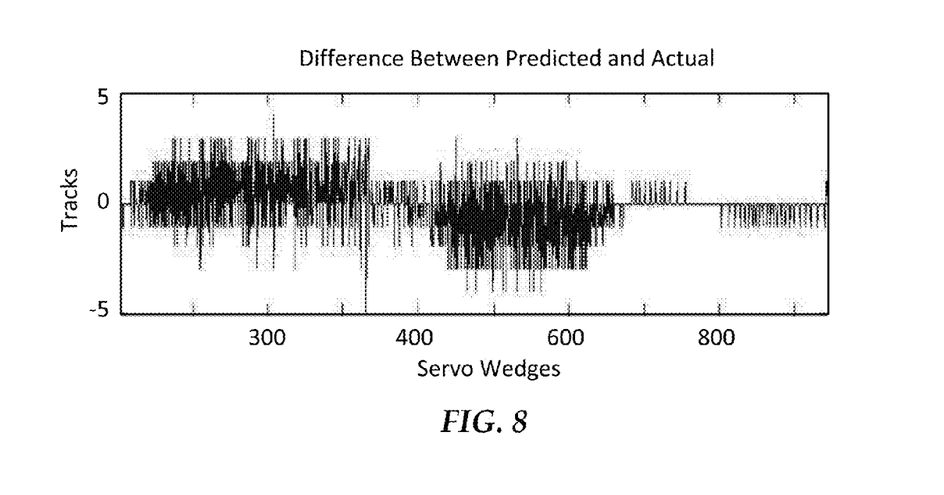
Figure 9:
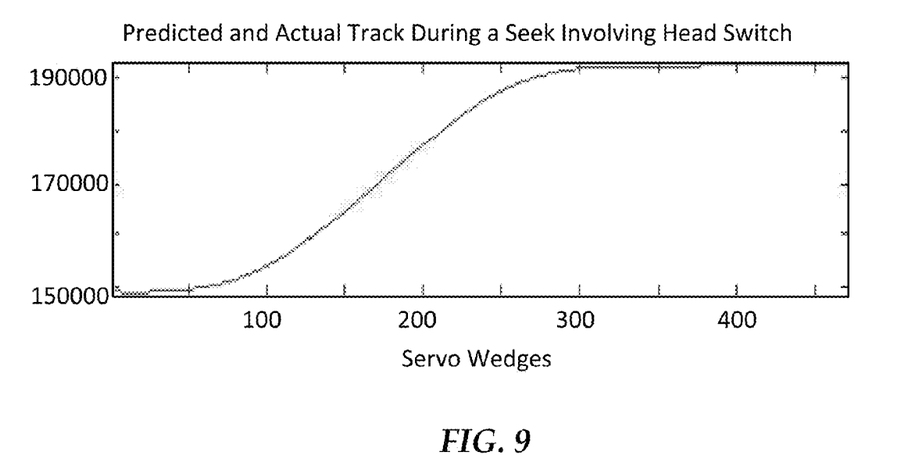
FIGS. 9 and 10 are graphs illustrating track prediction results during seeks involving a head switch for a simulated storage device according to an example embodiment.
Figure 10:
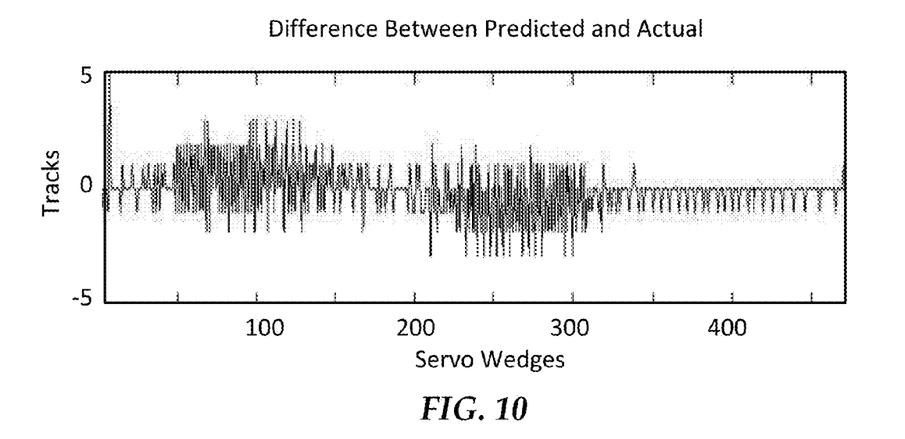

In FIGS. 5 and 6, graphs compare the predicted track to the actual track during a short seek on the same surface. In FIGS. 7 and 8, graphs compare the predicted track to the actual track during a long seek on the same surface. In FIGS. 9 and 10, graphs compare the predicted track to the actual track during a seek involving a head switch. The maximum prediction error seen in FIGS. 6, 8, and 10 are well within the +/−8 limit. Again, this is too small of a deviation to be seen when comparing the predicted versus actual curves in FIGS. 5, 7, and 9. After correction in all three cases, there is no deviation between the corrected and actual track values, an as a result there are no seek errors.

Figure 11A:
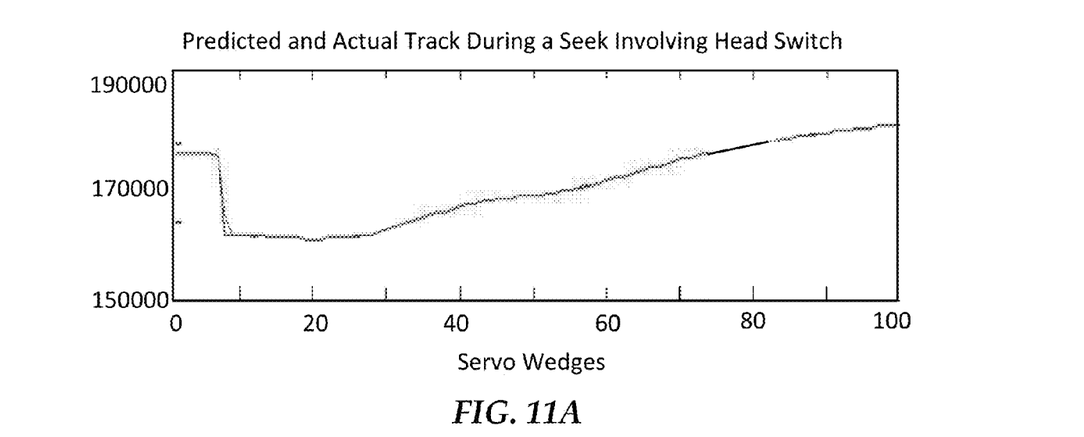
FIGS. 11A and 11B are a graphs illustrating track prediction results during a seek in the presence of error on the first sample for a simulated storage device according to an example embodiment.
Figure 11B:
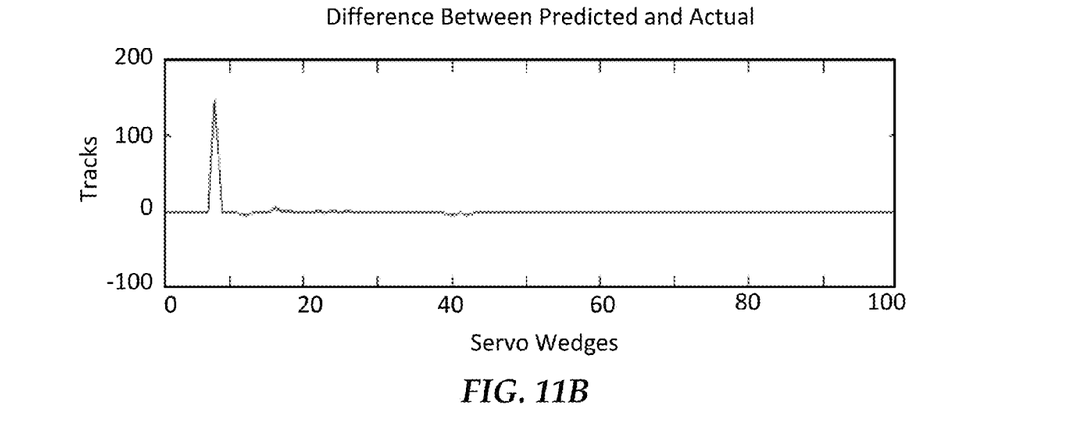
Figure 12:
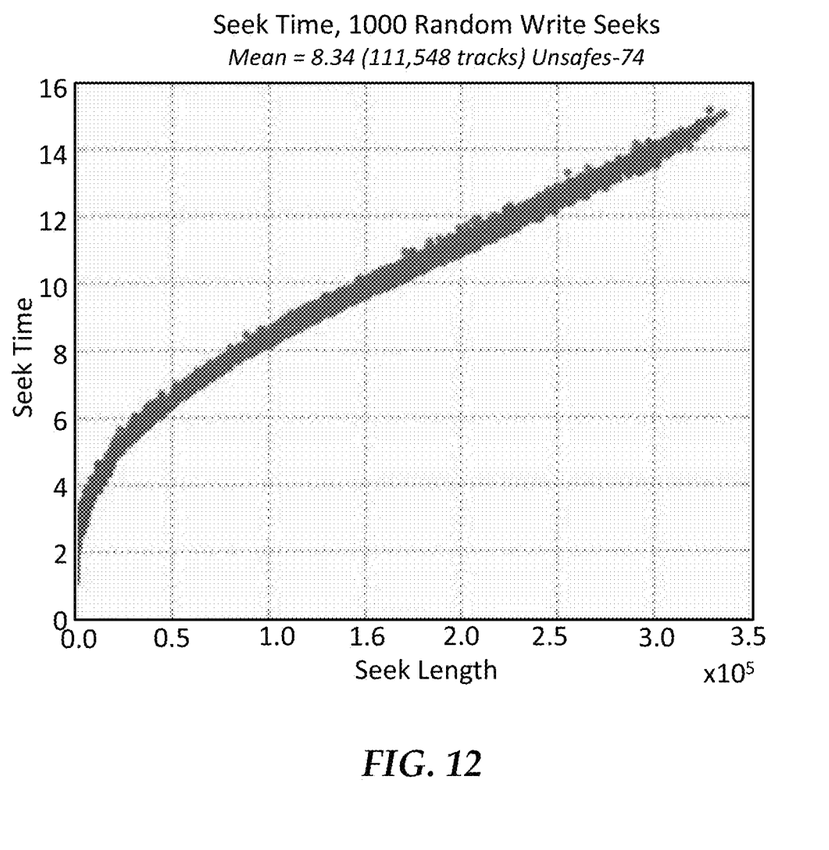
FIG. 12 is a graph illustrating seek time versus seek length for a simulated storage device according to an example embodiment.

In FIGS. 11A and 11B, graphs compare the predicted track to the actual track during when an error of 150 tracks is deliberately introduced on the first sample of the head switch. Because the head switch happens on the even sectors, up to 2048 tracks of error can be handled on the first sample in either direction. From the second sample onwards the prediction error falls back to well within acceptable limits of +/−8 tracks. After correction cases, there is no deviation between the corrected and actual track values, and as a result there are no seek errors. In FIG. 12, a plot graph shows the seek scatter plot for 10000 random seeks including head switches. The plots include seeks toward inner diameter and toward the outer diameter. There is not a single blown seek and there is not much scatter in the plot.

Figure 13:
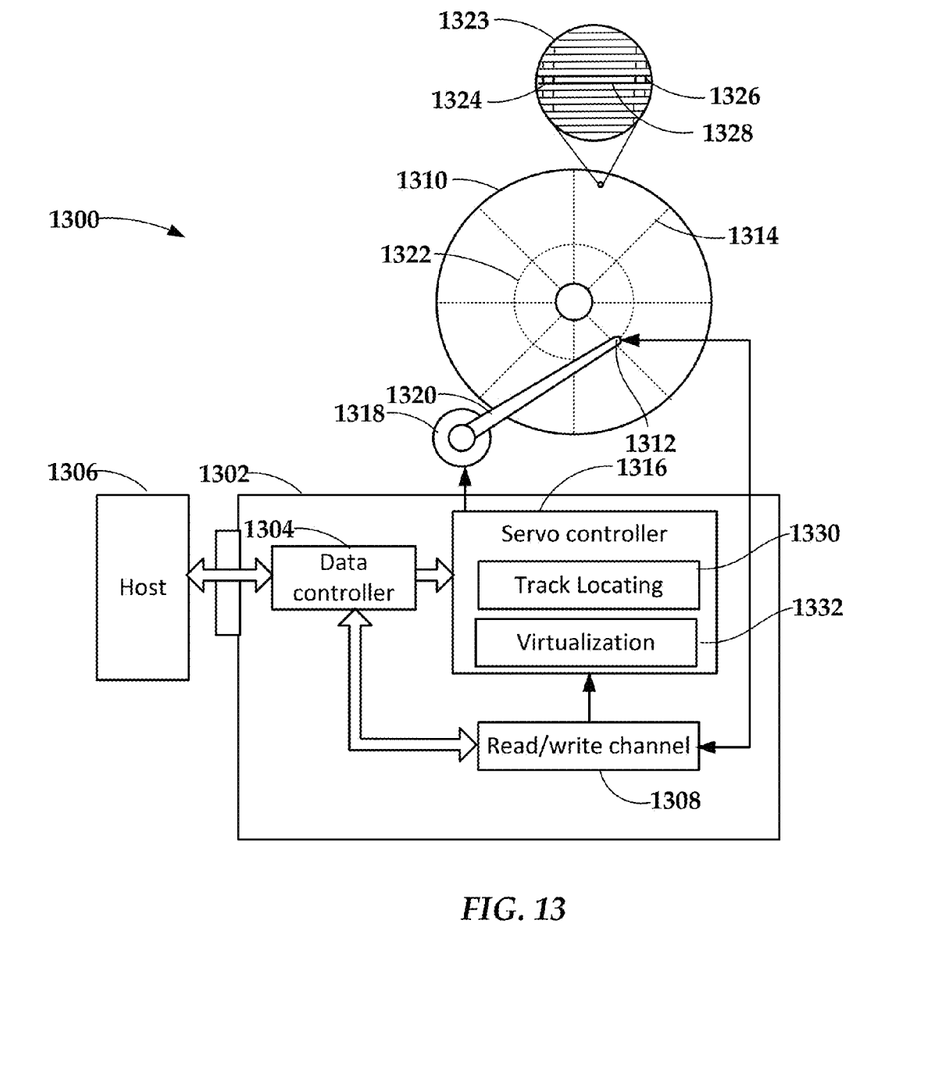
FIG. 13 is a block diagram of an apparatus according to an example embodiment.

In FIG. 13, a block diagram illustrates a control logic circuit 1302 of a data storage apparatus 1300. The circuitry 1302 includes a data controller 1304 that processes read and write commands and associated data from a host device 1306. The host device 1306 may include any electronic device that can be communicatively coupled to store and retrieve data from a data storage device, e.g., a computer. The data controller 1304 is coupled to a read/write channel 1308 that reads from and writes to a surface of a magnetic disk 1310.

The read/write channel 1308 generally converts data between the digital signals processed by the data controller 1304 and the analog signals conducted through one or more read/write heads 1312. The read/write channel 1308 also provides servo data read from servo wedges 1314 on the magnetic disk 1310 to a servo controller 1316. The servo controller 1316 uses these signals to drive an actuator 1318 (e.g., voice coil motor, or VCM and/or micro-actuator) that rotates an arm 1320 upon which the read/write heads 1312 are mounted.

Data within the servo wedges 1314 can be used to detect the location of a read/write head 1312. The servo controller 1316 uses servo data to move a read/write head 1312 to an addressed track 1322 and block on the magnetic disk 1310 in response to the read/write commands (seek mode). While data is being written to and/or read from the disk 1310, the servo data is also used to maintain the read/write head 1312 aligned with the track 1322 (track following mode).

As seen in example close-up region 1323, the disk 1310 includes a first servo wedge 1324 of a track 1328 of the magnetic disk 1310. The first servo wedge 1324 includes a first portion of a track identifier. A second servo wedge 1326 of the track 1328 stores a second portion of the track identifier. The second servo wedge 1326 is shown downtrack adjacent to the first servo wedge 1324, with user data stored therebetween. The track identifier facilitates locating the track 1324, and respective first and second portions may also include respective servo sector identifiers. The second portion includes least-significant bits of the track identifier that are also stored on the first portion.

The servo controller 1316 includes a track locating module 1330 that facilitates finding and combining the first and second portions stored in the servo wedges 1324, 1326, thereby determining the track identifier which is used to identify the track 1328. This identification is used to control movements of the arm 1320 via the actuator 1318, e.g., seek to a target track on the magnetic disk 1310.

The servo controller 1316 may include an optional virtualization module 1332 that maps virtual tracks to the servo wedges 1324, 1326. The virtualization module 1332 adds an offset to a servo or track identifier such that a virtual track can be used that minimizes cross-track oscillations of the arm 1320 due to non-concentricity between the servo wedges 1324, 1326 and the magnetic disk 1310. Generally, the use of partial track address portions of actual tracks described herein can be extended to virtual tracks.

Although two separate controllers 1304 and 1316 and a read write channel 1308 have been shown for purposes of illustration, it is to be understood that their functionality described herein may be integrated within a common integrated circuit package or distributed among more than one integrated circuit package. Similarly, a head disk assembly can include a plurality of data storage disks 1310, an actuator arm 1320 with a plurality of read/write heads 1312 (or other sensors) which are moved radially across different data storage surfaces of the disk(s) 1310 by the actuator motor 1318 (e.g., voice coil motor), and a spindle motor (not shown) which rotates the disk(s) 1310.

It will be understood that a device that writes servo tracks (e.g., multi-disk writer) may use an arrangement similar to what is shown in FIG. 13. For example, the track locating module 1330 may define partial track identifiers and write them together with servo wedges 1324 to define tracks 1326. The virtualization module 1332 may operate in the same or different apparatus, and may be used to as part of drive calibration phase of manufacturing. The virtualization module 1332 in such a case may determine reference changes that can be added to existing track identifiers so that virtual tracks can be used that minimize oscillation of the actuator arm due to non-concentricity of actual tracks relative to the disk/motor assembly.

Figure 14:
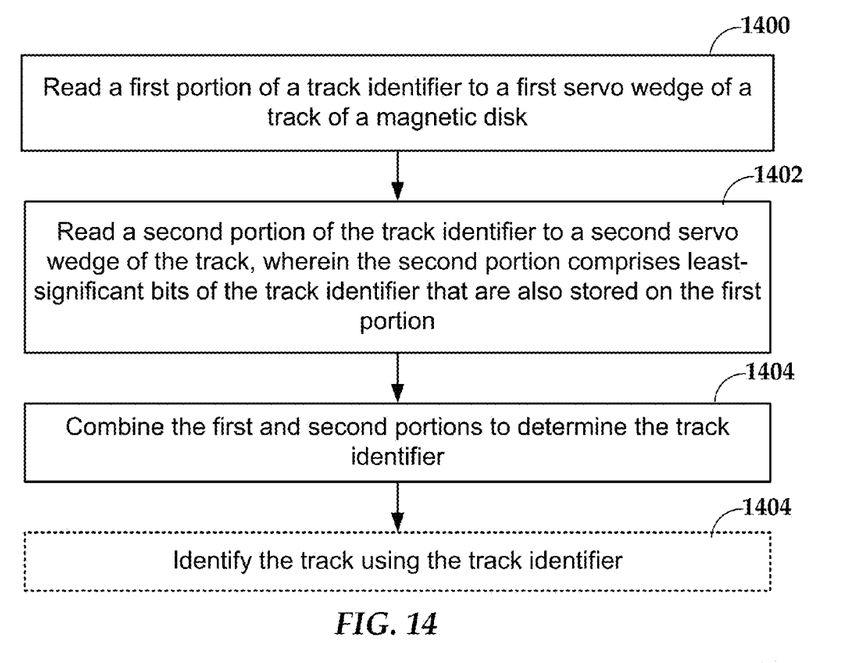
FIGS. 14 and 15 are flowcharts illustrating methods according to an example embodiment.

In reference now to FIG. 14, a flowchart illustrates a method according to an example embodiment. The method involves reading 1400 a first portion of a track identifier (e.g., first partial track identifier) from a first servo wedge of a track of a magnetic disk. A second portion of the track identifier (e.g., second partial track identifier) is read 1402 from a second servo wedge of the track. The first and second servo wedges may be downtrack adjacent. The second portion includes least-significant bits of the track identifier that are also stored in the first portion. The first and second portions are combined 1404 to determine the track identifier for both servo wedges, and the track is identified 1404 using the track identifier. The first and second servo wedges may be read in response to a head switch, and in such case the head switch may be caused to occur on the first servo wedge.

The first and second portions may further include first and second servo sector identifiers that are encoded with the respective first and second portions of the track identifiers. The first and second servo identifiers identify the respective first and second servo wedges. In one arrangement, the track identifier is M-bits long, the first and second portions are each M/2 bits long, and the least significant bits are N bits. In such a case, the first portion may include M/2 least significant bits of the track identifier, and the second portion includes M/2−N most significant bits of the track identifier.

Figure 15:
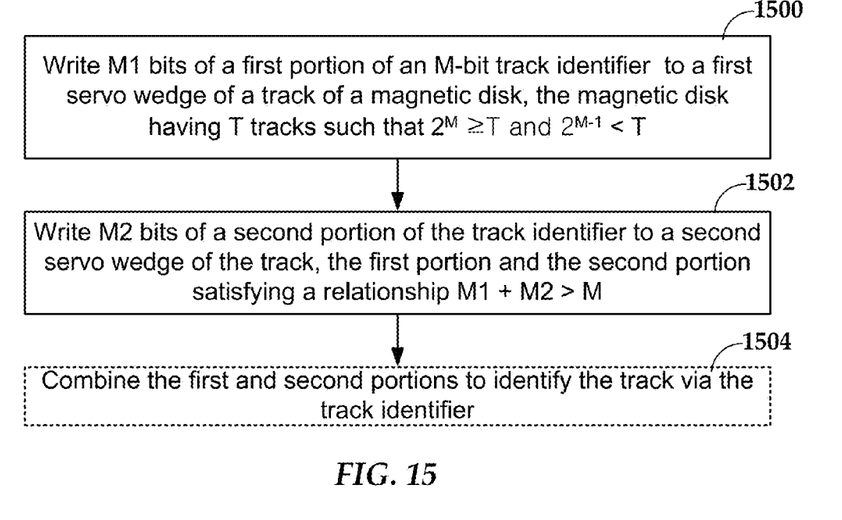

In reference now to FIG. 15, a flowchart illustrates a method according to another example embodiment. A first portion (having M1 bits) of an M-bit track identifier is written 1500 to a first servo wedge of a track of a magnetic disk. The magnetic disk has no more than T tracks such that $2^M \geq T$ and $2^{M-1} < T$. A second portion (having M2 bits) of the track identifier is written 1502 to a second servo wedge of the track. The first portion and the second portion satisfy a relationship M1+M2>M, and the first and second portions can be combined 1504 to identify the track via the track identifier. It is understood that the example methods shown in FIGS. 14 and 15 can be adapted for use in a servo writer (e.g., multi-disk writer) or a servo reader (e.g., data storage device). For example, the method shown in FIG. 14, may additionally or instead involve writing the first and second portions of the track identifiers to the respective servo wedges.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
  a servo controller configured with instructions that cause the controller to:
    read a first portion of a track identifier from a first servo wedge of a track of a magnetic disk;
    read a second portion of the track identifier from a second servo wedge of the track, wherein the second portion comprises least-significant bits of the track identifier that are also stored in the first portion, the first and second portions having an equal number of bits;
    combine the first and second portions to determine the track identifier for the first and second servo wedges; and
    identify the track using the track identifier.

2. The apparatus of claim 1, wherein the first and second servo wedges are downtrack adjacent servo wedges.

3. The apparatus of claim 1, wherein the first and second portions further comprise first and second servo sector identifiers that are encoded with the respective first and second portions, the first and second servo sector identifiers identifying the respective first and second servo wedges.

4. The apparatus of claim 1, wherein the least significant bits comprise N bits, the track identifier comprises M bits, and the first and second portions each comprise (M+N)/2 bits, wherein the first portion comprises (M+N)/2 least significant bits of the track identifier, and the second portion comprises (M−N)/2 most significant bits of the track identifier and N least significant bits of the track identifier.

5. The apparatus of claim 4, wherein the controller causes a head switch to occur on the first servo wedge.

6. The apparatus of claim 5, wherein the magnetic disk comprises T tracks such that $2^M \geq T$ and $2^{M-1} < T$.

7. The apparatus of claim 1, wherein the track identifier comprises a Gray code.

8. A method comprising:
  reading a first portion of a track identifier from a first servo wedge of a track of a magnetic disk;
  reading a second portion of the track identifier from a second servo wedge of the track, wherein the second portion comprises least-significant bits of the track identifier that are also stored in the first portion, the first and second portions having an equal number of bits;
  combining the first and second portions to determine the track identifier for the first and second servo wedges; and
  identifying the track using the track identifier.

9. The method of claim 8, wherein the first and second servo wedges are downtrack adjacent servo wedges.

10. The method of claim 8, wherein the first and second portions further comprise first and second servo sector identifiers that are encoded with the respective first and second portions, the first and second servo sector identifiers identifying the respective first and second servo wedges.

11. The method of claim 8, wherein the least significant bits comprise N bits, the track identifier comprises M bits, and the first and second portions each comprise (M+N)/2 bits, wherein the first portion comprises (M+N)/2 least significant bits of the track identifier, and the second portion comprises (M−N)/2 most significant bits of the track identifier and N least significant bits of the track identifier.

12. The method of claim 11, further comprising causing a head switch to occur on the first servo wedge.

13. A method comprising:
  writing M1 bits of an M-bit track identifier to a first servo wedge of a track of a magnetic disk, the magnetic disk comprising T tracks such that $2^M \geq T$ and $2^{M-1} < T$; and
  writing M2 bits of the track identifier to a second servo wedge of the track, the first portion and the second portion satisfying a relationship M1+M2>M, wherein M1 bits and M2 bits are combined to identify the track via the track identifier.

14. The method of claim 13, wherein the first and second servo wedges are downtrack adjacent servo wedges.

15. The method of claim 13, wherein the second portion comprises least-significant bits of the track identifier that are also stored in the first portion.

16. The method of claim 13, wherein the least significant bits comprise N bits and the first and second portions each comprise (M+N)/2 bits, wherein the first portion comprises (M+N)/2 least significant bits of the track identifier, and wherein the second portion comprises (M−N)/2 most significant bits of the track identifier and N least significant bits of the track identifier.

17. The method of claim 13, wherein the first and second portions further comprise first and second servo sector identifiers that are encoded with the respective first and second portions, the first and second servo sector identifiers identifying the respective first and second servo wedges.

18. The method of claim 13, wherein M1=M2.

* * * * *